United States Patent
Layeghi

(10) Patent No.: US 6,785,335 B1
(45) Date of Patent: Aug. 31, 2004

(54) METHOD FOR ADJUSTING THE BRIGHTNESS AND COLOR OF MPEG ENCODED VIDEO STREAMS

(75) Inventor: Shahab Layeghi, Los Altos, CA (US)

(73) Assignee: InterVideo Inc., Fremont, CA (US)

(*) Notice: Subject to any disclaimer, the term of this patent is extended or adjusted under 35 U.S.C. 154(b) by 326 days.

(21) Appl. No.: 09/711,347

(22) Filed: Nov. 9, 2000

(51) Int. Cl.⁷ ............................................. H04N 7/12
(52) U.S. Cl. ........................... 375/240.2; 375/240.24
(58) Field of Search .......................... 345/418, 589, 345/601; 348/443, 459; 375/240.01, 240.03, 240.12–240.16, 240.18, 240.2, 240.23, 240.24, 240.25, 240.29; 382/162, 260; H04N 7/12

(56) References Cited

U.S. PATENT DOCUMENTS

| | | | | |
|---|---|---|---|---|
| 5,473,380 A | * | 12/1995 | Tahara | 375/240.23 |
| 5,596,369 A | * | 1/1997 | Chau | 375/240.15 |
| 6,064,772 A | * | 5/2000 | Tanno et al. | 375/240.29 |
| 6,137,904 A | * | 10/2000 | Lubin et al. | 382/162 |
| 6,297,800 B2 | * | 10/2001 | Dagman | 345/601 |
| 6,539,120 B1 | * | 3/2003 | Sita et al. | 375/240.25 |
| 6,542,198 B1 | * | 4/2003 | Hung et al. | 348/459 |

* cited by examiner

Primary Examiner—Richard Lee
(74) Attorney, Agent, or Firm—Coudert Brothers LLP

(57) ABSTRACT

A system and corresponding method for adjusting the brightness and color of MPEG encoded video images. A digital versatile disk player capable of decoding a previously encoded MPEG video signal and adjusting the brightness and color of the entire previously encoded MPEG video signal based on a subset of information contained in the encoded input signal. The brightness and color adjustments are performed while the encoded MPEG video signal is in the frequency (dct) domain before motion compensation is performed. The digital versatile disk player also determines whether the particular block to be decoded is of a predetermined type and decodes such block accordingly.

14 Claims, 2 Drawing Sheets

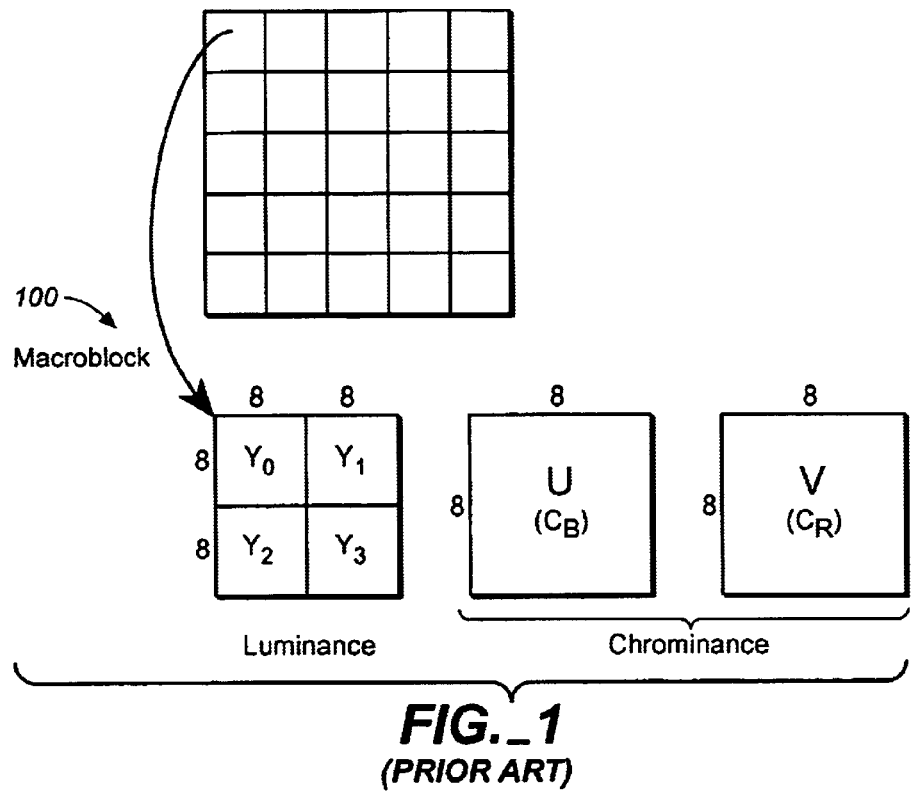
FIG._1
*(PRIOR ART)*
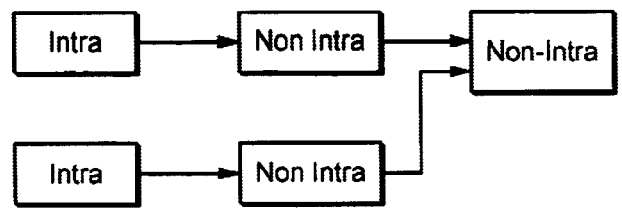
FIG._2
*(PRIOR ART)*

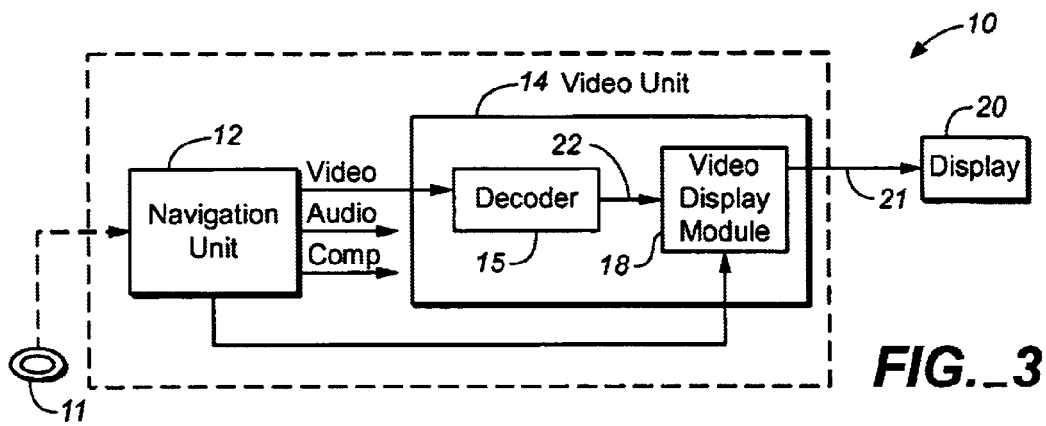
FIG._3
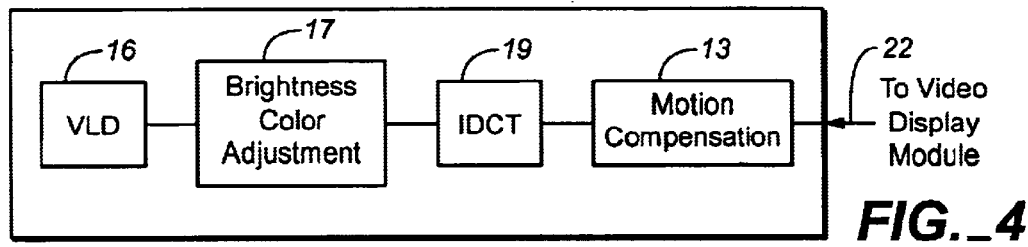
FIG._4
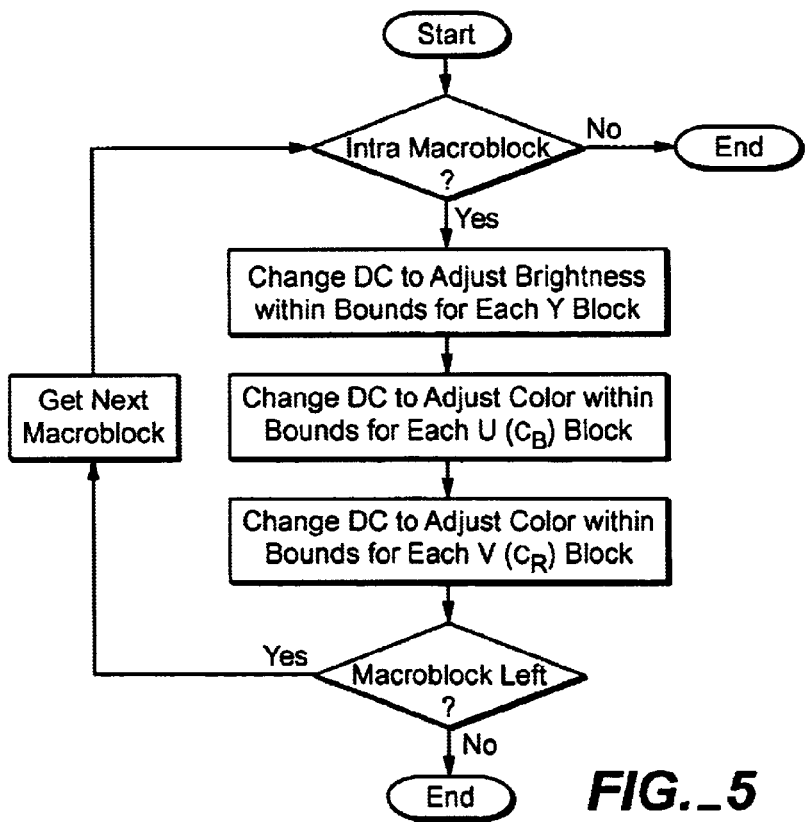
FIG._5

METHOD FOR ADJUSTING THE BRIGHTNESS AND COLOR OF MPEG ENCODED VIDEO STREAMS

NOTICE OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally related to MPEG video decoders and, more particularly, to a system and corresponding algorithm for adjusting the,brightness and color information of MPEG encoded video images.

BACKGROUND OF THE INVENTION

In the Motion Pictures Experts Group (MPEG) video standard, a sequence is comprised of a series of video frames. Each video frame in the sequence is subdivided into a number of rectangular information blocks, each containing a pixel, portion of the image. These information blocks are referred to as macroblocks. The pixel portions of the image are represented by a series of bits of data. In the MPEG video, standard, the data bits are encoded in a particular fashion. With respect to the attributes of the encoded image, the data bits contain information relating to the brightness (luminance) and color (chrominance) of the encoded image.

An MPEG decoder is used to decode the information present in each of the macroblocks to provide an image on a suitable display device. In the MPEG decoding methodology, motion compensation is performed on the image frames to adjust the image for any motion relative to the previous or subsequent reference frames. When the motion compensation stage is not a separate module within the MPEG decoder; the brightness and color controls are adjusted after the motion compensation and before display. To adjust the brightness and color, conventional decoders need to adjust all the pixel values comprising the image, which is a time consuming task. If a separate module performs the motion compensation, conventional decoders provide no means for controlling brightness and color.

SUMMARY OF THE INVENTION

The aforementioned and related drawbacks associated with known MPEG decoding schemes are substantially reduced or eliminated by the present invention. The present invention is directed to a system and corresponding method for adjusting the brightness and color of MPEG encoded video images. The disclosed system is a digital versatile disk player capable of decoding a previously encoded MPEG video signal and adjusting the brightness and color of the entire previously encoded MPEG video signal based on a subset of information contained in the encoded input signal. The disclosed system is capable of performing the brightness and color adjustment while the encoded MPEG video signal is in the frequency (dct) domain before motion compensation is performed. The digital versatile disk player of the present invention also includes means for determining whether the particular block to be decoded is of a predetermined type and decoding such block accordingly.

The present invention is embodied within a larger video display system comprising means for providing an input video signal having a plurality of encoded frames comprised of encoded macroblocks; decoding means for providing a plurality of decoded macroblocks comprised of decoded blocks, the decoding means including means for adjusting the brightness of the image represented by the encoded blocks contained within each macroblock in response to a first subset of data present in the, plurality of encoded blocks; and means for providing an output video signal in response to the plurality of decoded macroblocks, wherein the output signal is formatted to be displayed as a conventional video image. In a preferred embodiment of the present invention, the decoding means further includes means for adjusting the color of the image represented by the encoded macroblocks in response to a second subset of data present in the plurality of encoded blocks.

In a preferred embodiment of the present invention, the color and brightness properties of a decoded image in the frequency (dct) domain are adjusted by detecting whether the immediate macroblock is an intra block; extracting the luminance and chrominance blocks from the intra block; and adjusting the DC pixel component in the frequency domain, of each of the luminance blocks, wherein the brightness property of the image blocks is adjusted. For the chrominance blocks within the intra block, adjusting the DC pixel component in the frequency domain adjusts the color property of the image block.

An advantage of the present invention is that it provides the ability to independently control the brightness and color properties of decoded images when the last segments of decoding, e.g. IDCT (inverse discrete cosine transform) and/or motion compensation, are performed in a separate module.

Another advantage of the present invention is that it enhances the performance of MPEG video decoder devices.

BRIEF DESCRIPTION OF THE DRAWINGS

The aforementioned and related advantages and features of the present invention will become apparent upon review of the detailed description of the invention, taken in conjunction with the following drawings, where like numerals represent like elements, in which:

FIG. 1 is a schematic representation of the structure of a video frame and macroblocks within a video frame;

FIG. 2 is a schematic representation of two types of coded macroblocks included in an encoded video frame;

FIG. 3 is a block diagram of a digital versatile disk player incorporating a decoder module that performed the brightness and color adjustment algorithm of the present invention;

FIG. 4 is a block diagram of the decoder module that performs the brightness and color adjustment algorithm of the present invention; and FIG. 5 is a flow chart illustrating the operating steps performed by the decoder module illustrated in FIG. 4.

DETAILED DESCRIPTION OF THE INVENTION

The system and corresponding method for adjusting the brightness and color information of MPEG encoded video images will now be described with reference to FIGS. 1–5. In the MPEG video standards, a digital image is comprised of a series of frames. Some of the descriptions of the MPEG standards herein may not be applicable to all MPEG standards, however, the present invention is not limited to a particular MPEG standard. The appropriate standard for an application is known to those skilled in the art. FIG. 1 is a schematic representation of a video frame. As shown in FIG. 1, each frame is comprised of a series of blocks, referred to as macroblocks. In a preferred embodiment of the present invention, each macroblock is comprised of 4 luminance blocks and 2 chrominance blocks, each block containing 8×8=64 pixels A pixel is comprised of a series of bits of data, represented as: $\{X_1, X_2, X_3 \ldots X_N\}$ where N is a positive integer. Adjusting the brightness of a macroblock requires modification of 4×64 pixels. Adjusting each of the color components U and V requires modification of 64 pixels. A typical video frame consists of 24–30 frames per second, with each frame containing 300–5000 macroblocks depending on the resolution. Correspondingly, adjusting the brightness and color of an image using conventional techniques requires substantial computational effort. The present invention is directed to a computational algorithm which reduces the number of calculations that have to be performed when adjusting the brightness and color of a decoded image. The computational method will now be described with reference to the remaining figures.

FIG. 3 is a block diagram of a digital versatile disk (DVD) player 10 that performs the improved brightness and color adjustment algorithm according to the present invention. The DVD player 10 includes a navigation unit 12 and a corresponding video unit 14 which provides an output video signal to a display device 20 on line 21. In a preferred embodiment of the present invention, the display device 20 is a computer monitor. The video unit 14 includes a video decoder module 15 and a video display module 18. The decoder module 15 decodes the input video signal provided by the navigation unit 12 and provides the brightness and color adjustment to the encoded image according to the present invention.

The navigation unit 12, in FIG. 3, accepts a digital media element such as, for example, a digital versatile disk 11 having digital information, i.e. audio, video and other complementary information stored thereon. The navigation unit 12 demultiplexes the information from disk 11, providing the encoded video information on a first data line (VIDEO); and audio and other complementary information on the AUDIO and COMP lines, respectively. The encoded information (image) present on the VIDEO line is transferred to the video unit 14 through the video decoder module 15. The video decoder module 15 receives the encoded video bit stream from the navigation unit 12.

FIG. 4 is an exploded schematic diagram of the decoder module 15 of the present invention. As shown in FIG. 4, the decoder module 15 includes a Variable Length Decoder (VLD) 16 which represents the initial decoding of the video signal, as well as performing other required decoding tasks well known in the art, such as Inverse Scan and Inverse Quantization. An IDCT (inverse discrete cosine transform) module is provided which performs the inverse discrete cosine transformation to prepare the signal for the motion compensation stage. The IDCT module transforms the signal from the frequency domain to the space (spatial) domain to process the video signal for motion compensation and display.

As discussed above, the video signal is comprised of a number of video frames, which are further subdivided into macroblocks. In a preferred embodiment, each video frame is comprised of macroblocks that are 16 pixels ×16 pixels in size. Each 16×16 macroblock 100 consists of six blocks of size (8×8) with the first blocks $Y_0, Y_1, Y_2, Y_3$ containing luminance information and the remaining two blocks U and V containing the Cb and Cr chrominance information, respectively. In the preferred embodiment the video stream luminance and chrominance information is ordered, $Y_0Y_1Y_2Y_3UV$. Each luminance block represents brightness information of an 8×8 pixel region in the macroblock 16×16 pixel region; and the two chrominance blocks represent the color information for the 16×16 pixel region. The values in these blocks represent the information in a transformed domain called a dct (frequency) domain; which is obtained during encoding by a conventional algorithm performed on the corresponding space domain. In the conventional decoding methodology, an IDCT is performed on all components in the block in the dct (frequency) domain before the Motion Compensation stage and any brightness or color adjustment thereafter. The first component in the block in dct domain is the DC pixel component or average of all the pixels. The algorithm of the present invention adds or subtracts a certain value to/from this component in the dct domain; that is, before the IDCT is performed. This results in the addition or subtraction of a corresponding value to all components in the regular space domain once the IDCT makes the transformation. This enables the present invention to change the brightness and color in the dct domain by changing only the first component.

The component macroblocks in a frame within the MPEG encoded video image are divided into two types: intra coded (intra block) and non intra coded (non intra block). FIG. 2 is a representation of these two types of coded macroblocks. An intra block is encoded independently, with only information from the block itself. No motion compensation is performed on intra blocks. Motion compensation is performed at the macroblock level for non intra blocks through use of the reference block(s) to provide improved compression. Non intra blocks are derived indirectly from one or more intra blocks. For the present invention, only the brightness and color properties of the intra coded blocks are adjusted. The non intra blocks will be inherently changed similarly since the blocks used to derive the non intra blocks will have been adjusted prior.

The luminance and chrominance properties of the intra blocks are adjusted by Brightness Color Adjustment module 17 of the decoder module 15 based on the algorithm, shown in Table 1, applied to each macroblock of the image. The algorithm is coded in the preferred programming language, though other suitable programming languages can also be used.

TABLE 1

Algorithm for adjusting luminance and chrominance of intra blocks, shown for 11 bit implementation where boundary maximum value is 1023 and minimum is −1024.

```
if(base.mb_block.macroblock_type & MACROBLOCK_INTRA)
    {
    for (comp=0; comp<4; comp++)
        {
        base.block[comp][0]+=BrightnessControl;
        if(base.block[comp][0] > 1023)
            base.block[comp][0] = 1023;
        else if(base.block[comp][0] < −1024)
            base.block[comp][0] = −1024;
        }
    base.block[4][0] += UControl;
        if(base.block[4][0] > 1023)
            base.block[4][0] = 1023;
        else if(base.block[4][0] < −1024)
            base.block[4][0] = −1024;
```

TABLE 1-continued

Algorithm for adjusting luminance and chrominance of intra blocks, shown for 11 bit implementation where boundary maximum value is 1023 and minimum is −1024.

```
    base.block[5][0] += VControl;
        if(base.block[5][0] > 1023)
            base.block[5][0] = 1023;
        else if(base.block[5][0] < -1024)
            base.block[5][0] = -1024;
}
```

The algorithm in Table 1 assumes 11 bits are used to represent the brightness of a pixel and 11 bits to represent the chrominance. Although the preferred arithmetic precision for the present invention uses 11 bits, the present invention is not limited tb that number of bits. For a different number of bits per pixel arithmetic precision, the boundary constants in the algorithm would change, thereby adjusting the maximum value (e.g. 1023) and minimum value (−1024) constants shown in the table for 11 bit arithmetic precision. By further example, for an 8 bit implementation, the boundary constant value would be set to 127 for the maximum and −128 for the minimum, since that is the range of numbers represented by 8 bits arithmetic precision.

As illustrated above, the video decoder module 15 adjusts the DC element (represented by dimension fixed to [0] in the two dimensional base.block array variable) of the four luminance (brightness) and chrominance (color) blocks (U, V) respectively, when such corresponding properties require adjustment. Preferably there are four brightness blocks ($Y_0$, $Y_1$, $Y_2$, $Y_3$) and two color blocks (U, V) in the macroblock. Accordingly, when the first component of the brightness and color intra blocks are adjusted, the remaining blocks within the video frame will be adjusted accordingly since the non intra blocks are encoded/decoded using the information contained in the intra blocks. Consequently, by performing the brightness and color adjustment method in the frequency (dct) domain as in the present invention, the total number of computation steps required to be performed are substantially reduced. By reducing the number of computations required to adjust the brightness and color properties of a video image, the overall efficiency of the DVD player is improved. The present invention will reduce the amount of computations necessary for brightness and/or color adjustment to less than $\frac{1}{64}^{th}$ of the prior method which made adjustments after the IDCT transformation to the spatial domain. In addition to performance gains, the present invention: makes the brightness and color adjustment possible for the systems in which motion compensation and display are done in a separate module which the decoder does not have access to. After adjusting the brightness and color properties of the decoded image, a separate motion compensation module 13 performs standard motion compensation to provide an output signal. The output signal is then transferred to the video display module 18 (in FIG. 3) on line 22. The video display module 18, shown in FIG. 3, processes the decoded video signal from line 22 and provides an output, on line 21, suitable for the display device 20.

The computational steps performed by the video decoder module 15 to adjust the brightness and color properties of an MPEG decoded image will now be described with reference to FIG. 5. FIG. 5 is a flow chart illustrating the adjustment algorithm according to the present invention. For the first step, if the current block is an intra block then the algorithm continues, otherwise the next macroblock is processed. The next step adjusts the brightness control by applying a BrightnessControl factor to each component of the four luminance blocks, preferably $Y_0$, $Y_1$, $Y_2$, $Y_3$. The algorithm also bounds the adjusted component value within limits based on the arithmetic precision. The limits are the maximum and minimum values that can be represented by the number of bits used to represent the brightness, U chrominance and V chrominance of a pixel. As shown in Table 1 above, the preferred number of bits to represent the brightness, U chrominance and V chrominance of a pixel is 11 bits each. The next step adjusts the color Cb control by applying a UControl factor to the U block component, with the result also bounded. The next step adjusts the color Cr control by applying a VControl factor to the V block component; and similarly bounds the result.

The foregoing detailed description of the invention has been provided for the purposed of illustration and description. Although a preferred embodiment of the present invention has been described in detail herein with reference to the accompanying drawings, it is to be understood that the invention is not limited to the precise embodiment disclosed, and that various changes and modifications to the invention are possible in light of the above teaching. Accordingly, the scope of the present invention is to be defined by the claims appended hereto.

What is claimed is:

1. A method of adjusting the visual brightness and color properties of a video stream, comprising the steps of:

(a) receiving an input video signal, said input video signal comprising a plurality of encoded frames representing an encoded image; said encoded frames having a plurality of encoded macroblocks, wherein each encoded macroblock contains a pixel portion of an encoded image;

(b) detecting whether the encoded macroblock to be decoded is coded with reference to other encoded macroblocks, and if the encoded macroblock is so coded, then designating the encoded macroblock as a non intra block and proceeding to the next encoded macroblock and repeating step (b);

(c) designating the encoded macroblock that is coded independently of other encoded macroblocks as an encoded intra block;

(d) extracting a plurality of luminance and chrominance blocks from the encoded intra block;

(e) extracting a DC pixel component representative of a luminance property of each of said luminance blocks, and adjusting the DC pixel component of each of said luminance blocks such that the brightness is controlled;

(f) detecting whether the adjusted DC pixel component of each of said luminance blocks is within boundaries of the range for the number of bits of arithmetic precision used for the pixel, and setting the adjusted DC pixel component to the nearest of said boundaries of said range if the adjusted DC pixel component is not within said range;

(g) extracting a DC pixel component representative of a chrominance property of each of said chrominance blocks, and adjusting the DC pixel component of said chrominance blocks such that the color is controlled;

(h) detecting whether the adjusted DC pixel component of each of said chrominance blocks is within the boundaries of the range for the number of bits of arithmetic precision used for the pixel, and setting the adjusted DC pixel component to the nearest of said boundaries of said range if the adjusted DC pixel component is not within said range;

(i) outputting an adjusted video stream containing said luminance and chrominance blocks having corresponding adjusted DC pixel components;

(j) proceeding to the next encoded macroblock in said video stream, and returning to step (b).

2. The method of claim 1, wherein adjustments to said luminance and chrominance blocks are made in the frequency domain prior to Inverse Discrete Cosine Domain Transform (IDCT) processing, wherein said IDCT processing transforms said adjusted video stream to the spatial domain.

3. The method of claim 1, comprising the further step of processing by a Variable Length Decoder (VLD) means prior to step (b).

4. The method of claim 1, wherein said adjusted video stream output is further processed to fully decode said adjusted video stream for input to a video display module, wherein said video display module processes the fully decoded adjusted video stream for display on a display device.

5. The method of claim 1, wherein each of said encoded macroblocks is comprised of four luminance blocks and two chrominance blocks.

6. The method of claim 1, wherein said boundaries of said range in step (f) are the maximum and minimum number that are represented by the number of bits used to represent the luminance property for each pixel in said encoded macroblock.

7. The method of claim 1, wherein said boundaries of said range in step (h) are the maximum and minimum number that are represented by the number of bits used to represent each chrominance property for each pixel in said encoded macroblock.

8. The method of claim 6, wherein eleven bits are used to represent the luminance of a pixel and wherein said range is −1024 to 1023.

9. The method of claim 7, wherein eleven bits are used to represent each of the chrominance properties of a pixel and wherein said range is −1024 to 1023.

10. A method of adjusting the visual brightness and color properties of a video stream, comprising the steps of:
(a) receiving an input video signal, said input video signal comprising encoded frames representing an encoded image; said encoded frames having a plurality of encoded macroblocks of compressed video data, wherein each encoded macroblock contains a pixel portion of the encoded image;
(b) extracting an encoded macroblock from said encoded frames; and iteratively performing the following steps (c) to (n):
(c) if said encoded macroblock to be decoded is coded with reference to other encoded macroblocks, then performing the following steps (c1) and (c2):
(c1) accessing next encoded macroblock;
(c2) returning to step (c);
(d) designating said encoded macroblock as an intra block;
(e) establishing a comp counter for storing values used in performing iteration;
(f) setting said comp counter to an initial condition of 0;
(g) extracting a luminance block from said encoded macroblock;
(h) for comp less than 4, iteratively performing the following steps (h1) to (h6):
(h1) extracting a DC pixel component representative of a luminance property of said luminance block;
(h2) adding a brightness control factor to the DC pixel component of said luminance block, wherein the DC pixel component of said luminance block is adjusted and a brightness property is controlled;
(h3) if the adjusted DC pixel component of said luminance block is greater than the maximum range then setting the adjusted DC pixel component to equal the maximum range; wherein the maximum range is the largest positive number that is represented by the number of bits used to represent the brightness property of a pixel;
(h4) if the adjusted DC pixel component is less than the minimum value, then setting the adjusted DC pixel component to equal the minimum value, wherein the minimum value is the largest negative number that is represented by the number of bits used to represent the brightness of the pixel;
(h5) incrementing said comp counter by one;
(h6) extracting a different luminance block within on encoded intra block;
(i) extracting a U chrominance block from said encoded macroblock, wherein comp equals 4;
(j) performing the following steps (j1) to (j3):
(j1) adding a UControl factor to a DC pixel component representative of a U chrominance property of said U chrominance block, wherein the DC pixel component of said U chrominance block is adjusted and a Cb color property is controlled;
(j2) if the adjusted DC pixel component of said U chrominance block is greater than the maximum range then setting the adjusted DC pixel component to equal the maximum range; wherein the maximum range is the largest number that is represented by the number of bits used to represent the chrominance of the pixel;
(j3) if the adjusted DC pixel component of the U chrominance block is less than the minimum range, then setting the adjusted DC pixel component to equal the minimum value, wherein the minimum value is the largest negative number that is represented by the number of bits used to represent the chrominance of the pixel;
(k) incrementing said comp counter by one; wherein comp is equal to 5;
(l) extracting a V chrominance block from the encoded macroblock, and performing the following steps (l1) to (l3):
(l1) adding a VControl factor to a DC pixel component representative of a V chrominance property of said V chrominance block, wherein the DC pixel component of said V chrominance block is adjusted and a Cr color property is controlled;
(l2) if the adjusted DC pixel component of said V chrominance block is greater than the maximum range then setting the adjusted DC pixel component to equal the maximum range; wherein the maximum range is the largest number that is represented by the number of bits used to represent the chrominance of the pixel;
(l3) if the adjusted DC pixel component of the V chrominance block is less than the minimum range, then setting the adjusted DC pixel component to equal the minimum value, wherein the minimum value is the largest negative number that is represented by the number of bits used to represent the chrominance of the pixel;
(m) outputting an adjusted video stream containing said luminance, U chrominance and V chrominance blocks, each having a corresponding adjusted DC pixel component; and
(n) proceeding to the next macroblock in said input video signal.

11. The method of claim 10, wherein each DC pixel component is the average of all pixels of the corresponding luminance or chrominance block.

12. The method of claim 10, wherein the adjusting of each corresponding DC pixel component is performed in the frequency domain.

13. The method of claim 10, wherein said input video signal is processed by a Variable Length Decoder (VLD) means prior to step (b).

14. The method of claim 10; wherein step (m) further comprises further decoding said adjusted video stream and outputting said further decoded adjusted video stream to a video display module for processing for display on a display device.

* * * * *